(12) United States Patent
Takeuchi et al.

(10) Patent No.: US 8,385,357 B2
(45) Date of Patent: Feb. 26, 2013

(54) NETWORK DEVICE OF TRANSFER SWITCHING TYPE AND FRAME TRANSFER METHOD

(75) Inventors: Junichi Takeuchi, Kanagawa (JP); Naoto Iga, Kanagawa (JP); Hideki Goto, Okazaki (JP); Shinichi Iiyama, Tokyo-to (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 218 days.

(21) Appl. No.: 12/934,830

(22) PCT Filed: Mar. 26, 2009

(86) PCT No.: PCT/IB2009/005333
§ 371 (c)(1),
(2), (4) Date: Oct. 15, 2010

(87) PCT Pub. No.: WO2009/118650
PCT Pub. Date: Oct. 1, 2009

(65) Prior Publication Data
US 2011/0026538 A1    Feb. 3, 2011

(30) Foreign Application Priority Data
Mar. 26, 2008  (JP) ................................. 2008-080666

(51) Int. Cl.
*H04L 12/28* (2006.01)
*H04L 12/56* (2006.01)

(52) U.S. Cl. ........ 370/401; 370/394; 370/389; 370/473; 370/474; 370/413; 370/254; 370/402; 370/400; 709/225; 709/234; 709/238; 709/251

(58) Field of Classification Search .......... 370/401–404, 370/468–478, 479, 310.2, 312, 493, 395, 370/508, 391, 389, 234–238
See application file for complete search history.

(56) References Cited

U.S. PATENT DOCUMENTS
(Continued)

FOREIGN PATENT DOCUMENTS
JP    9 18507    1/1997
JP    09 149068  6/1997
(Continued)

OTHER PUBLICATIONS
International Search Report issued Sep. 4, 2009 in PCT/IB09/005333 filed Mar. 26, 2009.

*Primary Examiner* — Dang Ton
*Assistant Examiner* — Sai Aung
(74) *Attorney, Agent, or Firm* — Oblon, Spivak, McClelland, Maier & Neustadt, L.L.P.

(57) ABSTRACT

A network device of is a network device that transfers frames by repeating, in a constant cycle, a reserved transfer interval and a free transfer interval. The network device includes a transmission port, a cycle timer, a mode switching control unit that monitors a transfer state of the transmission port and selects a store-and-forward system when the transmission port is in the transfer process and selects a cut-through system when the transmission port is not in the transfer process, and a transfer prohibition control unit that selects the cut-through system as a transfer system when a non-reserved frame is transmitted and switches a transfer method of the non-reserved frame to the store-and-forward system when a reserved transfer interval is established, with reference to the cycle timer.

12 Claims, 6 Drawing Sheets

U.S. PATENT DOCUMENTS

| | | | | |
|---|---|---|---|---|
| 4,679,191 A | * | 7/1987 | Nelson et al. | 370/355 |
| 5,475,681 A | * | 12/1995 | White et al. | 370/349 |
| 5,524,007 A | * | 6/1996 | White et al. | 370/419 |
| 5,941,952 A | * | 8/1999 | Thomas et al. | 709/234 |
| 6,088,343 A | * | 7/2000 | King | 370/329 |
| 6,144,668 A | | 11/2000 | Bass et al. | |
| 6,671,275 B1 | | 12/2003 | Wong et al. | |
| 6,985,492 B1 | * | 1/2006 | Thi et al. | 370/429 |
| 7,031,341 B2 | * | 4/2006 | Yu | 370/469 |
| 7,769,015 B2 | * | 8/2010 | Huang et al. | 370/394 |
| 7,933,295 B2 | * | 4/2011 | Thi et al. | 370/493 |

FOREIGN PATENT DOCUMENTS

WO     00 11838     3/2000

\* cited by examiner

NETWORK DEVICE OF TRANSFER SWITCHING TYPE AND FRAME TRANSFER METHOD

BACKGROUND OF THE INVENTION

1. Field of the Invention

This invention relates to a network device of a transfer switching type and a frame transfer method.

2. Description of the Related Art

Figure 5:
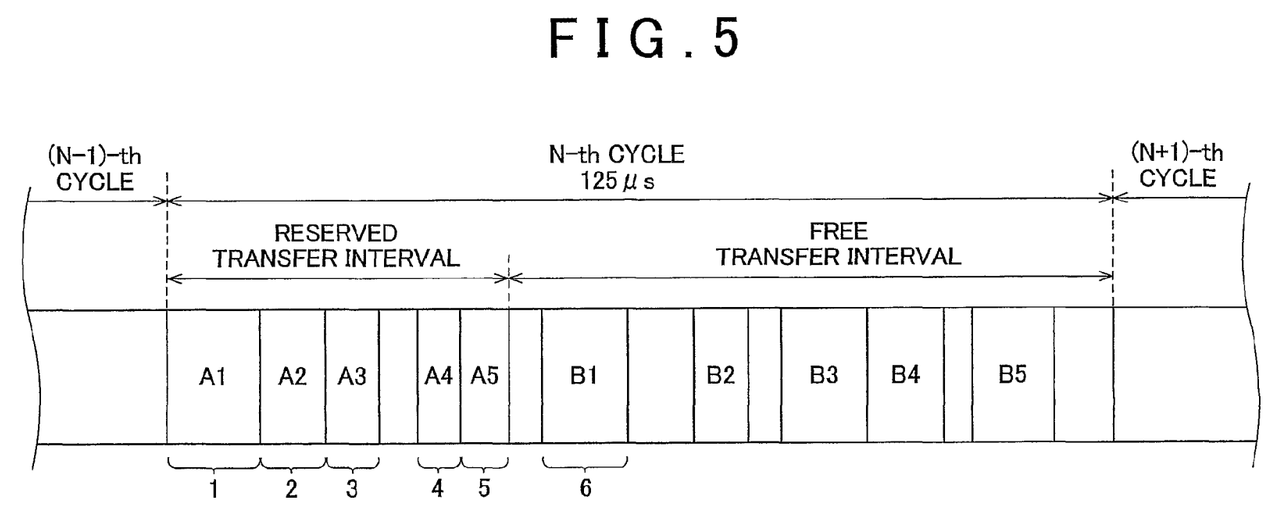
FIG. 5 illustrates an example of a cycle pattern.

Real-time communication technology such as Institute of Electrical and Electronic Engineers (IEEE) 1394 employs a transfer system (referred to hereinbelow as "cyclic transfer") using a cycle including real time data and best effort data. FIG. 5 shows a standard cycle pattern. As shown in FIG. 5, cycles are repeated by taking predetermined 125 μsec as one cycle. Packet data, that is, a frame, occupying a predetermined time band within this one cycle is transferred between network devices. Here, the first half of one cycle is taken as a reserved transfer interval and the second half is taken as a free transfer interval.

The reserved transfer interval is used for real time data communication. In this interval, for example, as shown in FIG. 5, a predetermined time, that is, bands 1 to 5 are reserved for frame transmission. The reserved bands 1 to 5 are used only between the respective set devices. Where frames A1 to A5 of real time data are arranged in the reserved bands 1 to 5, a constant amount of data communication is possible within a constant time. By contrast, the free transfer interval is used for best effort data communication that has no real time property. In this interval, no band is reserved. For example, as shown in FIG. 5, where a band 6 of this interval is vacant during data transfer, a frame B1 is arranged therein and data communication between the devices is performed. Frames B2 to B5 are similarly arranged.

Figure 6:
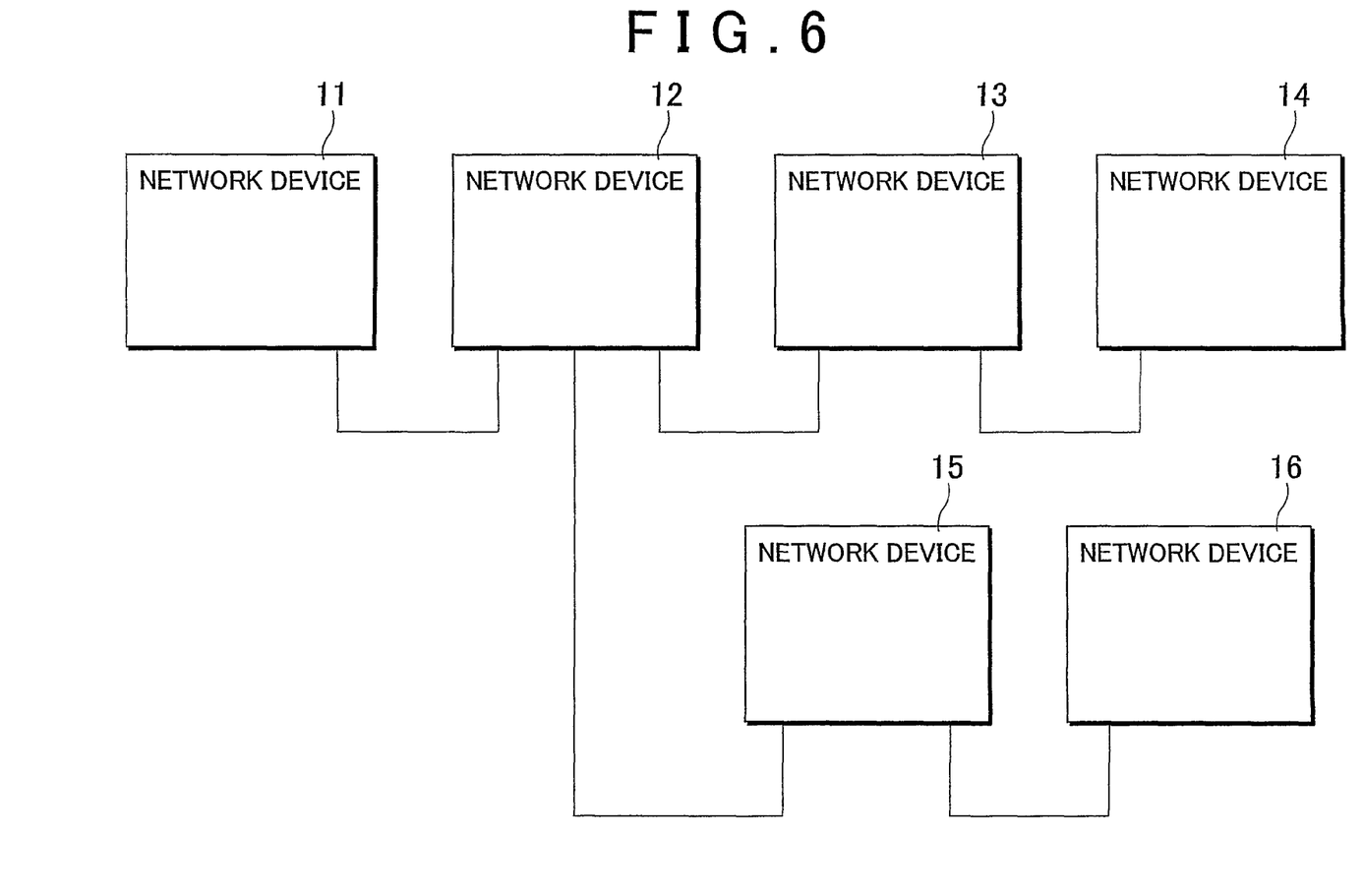
FIG. 6 is a schematic diagram of a network.

For example, a daisy-chain connection composed of network devices 11 to 14 shown in FIG. 6 and a star connection composed of network devices 11, 12, 13, and 15 can be considered as a network configuration that realizes a cyclic transfer. Each network device has a bridge function, and network devices 12, 13, and 15 can transfer a frame transmitted from a network device on one side of the device to a network device on the other side. As a result, communication can be performed by using a bridge function even between the network devices that are not directly connected to each other.

There is a trend to applying the above-described cyclic transfer to Ethernet (registered trademark), which is a Local Area Network (LAN) standard, and high speed and high reliability of data communication with the cyclic transfer are sought for a LAN using the Ethernet (registered trademark).

A cut-through system and a store-and-forward system are available as frame transfer systems. In the cut-through system, the transmitted data are immediately transferred without error checking. As a result, the delay time is small. However, data having errors can fill the network and transmission efficiency can drop. In the store-and-forward system, the transmitted data are transferred after accumulation. Therefore, errors can be checked. However, the delay time increases over that in the cut-through system by the time required for data accumulation.

Thus, the cut-through system and store-and-forward system have exactly opposite features. Accordingly, the cut-through system and store-and-forward system are sometimes used together so that switching therebetween is possible. For example, Japanese Patent Application Publication No. 9-18507 (JP-A-9-18507) and Japanese Patent Application Publication No. 9-149068 (JP-A-9-149068) disclose a method for switching from the cut-through system to the store-and-forward system when the number of errors or error frequency in data rises.

However, when the method disclosed in JP-A-9-18507 or JP-A-9-149068 is applied to the cyclic transfer, a delay can occur and there is a risk of data being not present in the reserved band. More specifically, where a network device that performs transferring is switched to the store-and-forward system due to error occurrence, transfer delay is caused by data accumulation. As a result, data are not present in the band reserved by the network device that is a transmission source, and a shift can occur in a band reserved by another network device. In this case, one of competing data has to wait, thereby further increasing the delay.

SUMMARY OF THE INVENTION

The first aspect of the invention relates to a network device that transfers frames by repeating, in a constant cycle, a reserved transfer interval that is a time band, in which a frame is transferred with a reservation, and a free transfer interval that is a time band, in which a frame is freely transferred. The network device includes a transmission port, a cycle timer, a mode switching control unit that monitors a transfer state of the transmission port and selects a store-and-forward system as a transfer method when the transmission port is in the transfer process and selects a cut-through system as a transfer method when the transmission port is not in the transfer process, and a transfer prohibition control unit that selects the cut-through system as a transfer system when a non-reserved frame is transmitted and switches a transfer method of the non-reserved frame to the store-and-forward system when a reserved transfer interval is established, with reference to the cycle timer.

The second aspect of the invention relates to a frame transfer method by which a frame is transferred between network devices by repeating, in a constant cycle, a reserved transfer interval that is a time band, in which a frame is transferred with a reservation, and a free transfer interval that is a time band, in which a frame is freely transferred. The frame transfer method includes monitoring a transfer state of a transmission port of the network device; selecting a store-and-forward system as a transfer method when the port is in a transfer process; selecting a cut-through system as a transfer method when the port is not in a transfer process; and selecting the cut-through system as a transfer system when a non-reserved frame is transmitted, and switching a transfer method of the non-reserved frame to the store-and-forward system when the reserved transfer interval is established.

The network device in accordance with the invention can reduce a delay of real-time data transfer.

BRIEF DESCRIPTION OF THE DRAWINGS

The foregoing and further features and advantages of the invention will become apparent from the following description of example embodiments with reference to the accompanying drawings, wherein like numerals are used to represent like elements, and wherein.

DETAILED DESCRIPTION OF EMBODIMENTS

A specific embodiment employing the invention will be described below in greater detail with reference to the appended drawings. However, the invention is not limited to the below-described embodiment. Furthermore, the description and drawings below are appropriately simplified to clarify the explanation.

Figure 1:
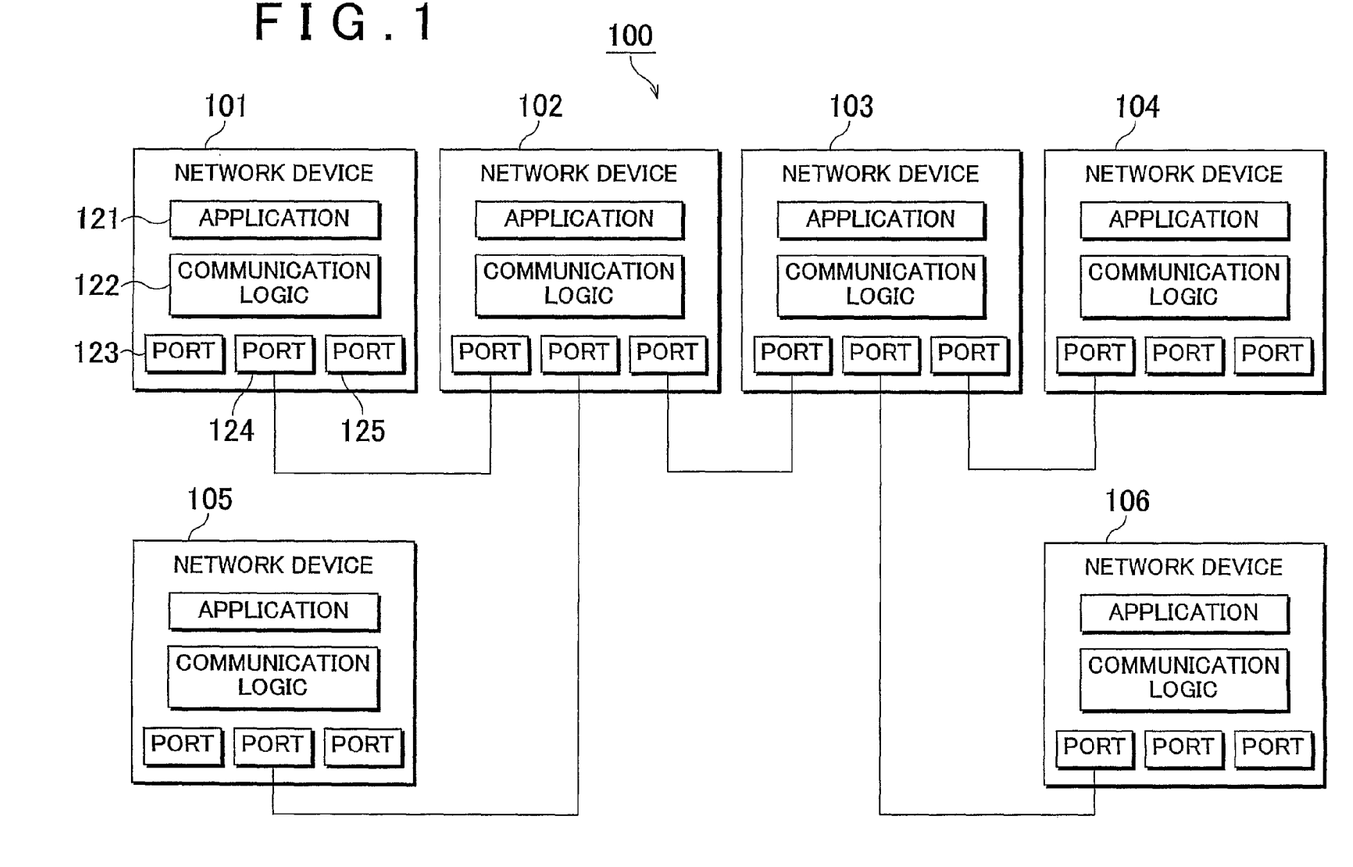
FIG. 1 is a schematic diagram of a network of the embodiment.

FIG. 1 shows a general network configuration and a network device of the embodiment. As shown in FIG. 1, a network 100 has network devices 101 to 106. The network devices 101 to 106 perform transmission and reception of frames by cyclic transfer. Because the network devices 101 to 106 have identical configuration, the network device 101 will be explained herein by way of example. The network device 101 has an application 121, a communication logic 122, and ports 123 to 125.

The application 121 generates data to be used in another network device in the network or uses data generated in another network device. Examples of the application include generation of video data by using a peripheral device such as a camera and transmission of the video data to another network device and display of video data transmitted by another network device on a display.

The communication logic 122 is configured by a Medium Access Control (MAC) bridge (including a switch, a rooting table, etc. for realizing bridge communication between a plurality of ports in the device itself) specified by IEEE 802.1 or a circuit performing operation and control specified by a protocol such as Spanning Tree Protocol (STP). In the embodiment, control information for determining where the frame is a reserved frame is further added to the frame.

The ports 123 to 125 perform transmission and reception of frames between network devices. For example, a connector or a cable specified by IEEE 802.3 and hardware conforming to a transmission-reception protocol such as MAC can be used as the ports 123 to 125.

The communication logic 122 and application 121 connected to adjacent network devices via the ports 123 to 125, thereby configuring the network 100. The connection between the network devices may be a daisy-chain connection composed of network devices 101 to 104 or a star connection composed of network devices 101, 102, 103, and 105.

In each network device, a rooting table (not shown in the figure) located inside the device saves information indicating which port of the device is connected to which port of another network device. As a result, even when a plurality of ports are used, as in the network device 102 or 103, each network device performs communication between the ports of the adequate network device on the basis of this information.

Figure 2:
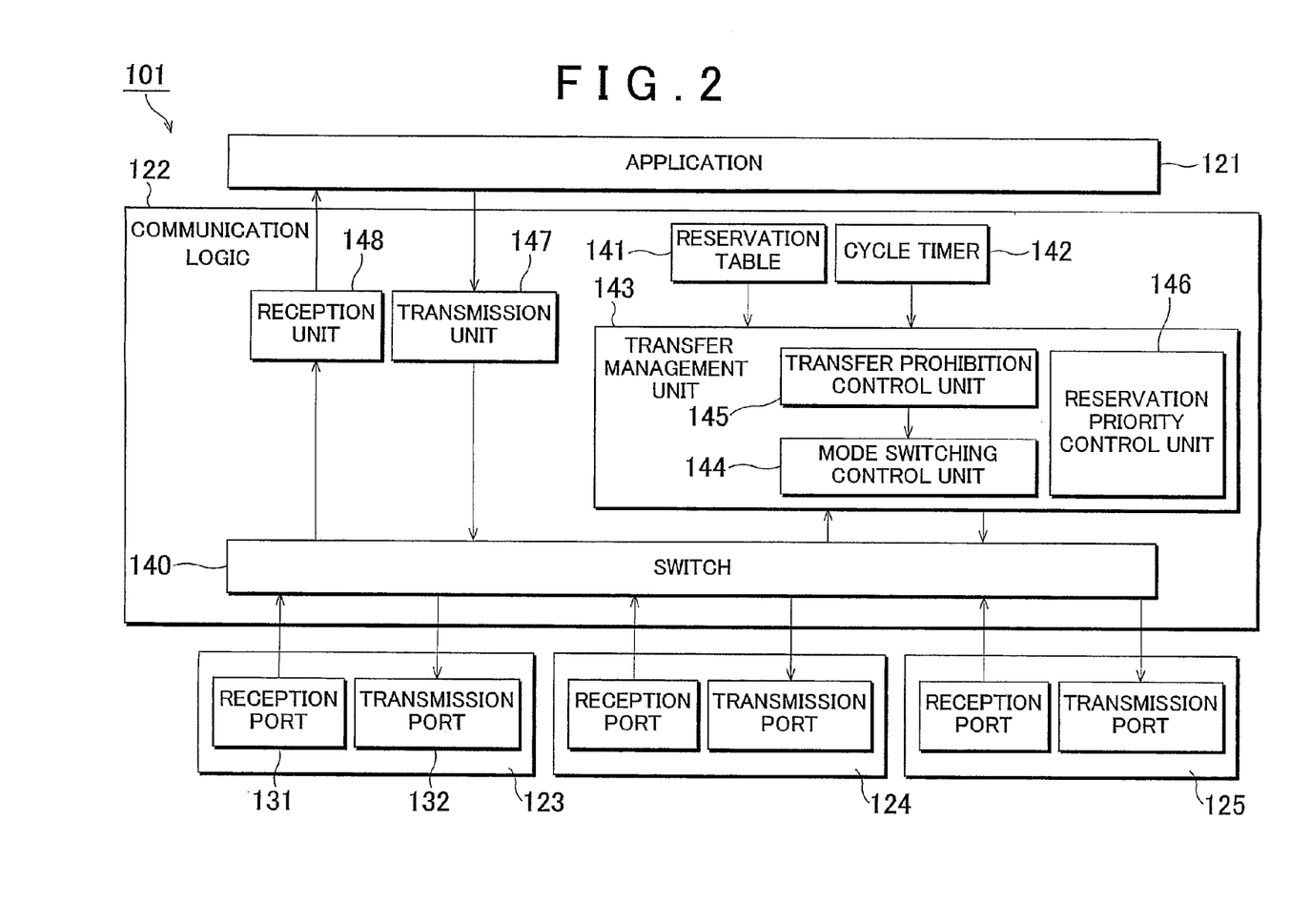
FIG. 2 is a block diagram of a network device of the embodiment.

FIG. 2 shows in greater detail a configuration block diagram of the network devices 101 to 106 shown in FIG. 1. Because the network devices 101 to 106 having identical configuration, the network device 101 will be explained hereinbelow by way of example. In FIG. 2 components denoted by the same reference numerals as in FIG. 1 have similar configuration and explanation thereof is herein omitted.

Each port from among the ports 123 to 125 has a respective reception port 131 and a transmission port 132. The reception port 131 sends a frame received from another network device to a below-described switch 140. The transmission port 132 transmits a frame sent from the switch 140 to another network device.

The communication logic 122 has the switch 140, a reservation table 141, a cycle timer 142, a transfer management unit 143, a transmission unit 147, and a reception unit 148. Here, the transfer management unit 143 has a mode switching control unit 144, a transfer prohibition control unit 145, and a reservation priority control unit 146.

The switch 140 performs bridge communication between a plurality of ports in the device itself, for example, between the reception port 131 of the port 123 and the transmission port 132 of the port 125. Furthermore, the switch sends a frame received by the device to the reception unit 148 and sends a frame sent from the transmission unit 147 to the transmission port 132 of the designated port. Here, the reception unit 148 sends the received data to the adequate application 121 even when the data received from the switch 140 are the address of the device itself. The transmission unit 147 sends data received from the application 121 to the switch 140. Furthermore, the switch 140 sends to the transfer management unit 143 information indicating whether the transmission port 132 connected to the frame transmission destination is in the process of frame transfer.

The reservation table 141 has information indicating which time band has been reserved. A reserved transfer interval is determined by the time band in which a reserved frame is reserved, as shown in FIG. 5. As shown in FIG. 5, the reserved frame is not necessarily reserved in all the time bands of the reserved transfer interval. For example, no reservation is made between A3 and A4. The cycle timer 142 measures time information of the device and sends this time information to the transfer management unit 143.

The mode switching control unit 144 of the transfer management unit 143 switches between the cut-through system and the store-and-forward system. More specifically, when the transmission port 132 connected to the frame transmission destination is in the frame transfer process, the store-and-forward system is selected, and when the transmission port is not in the frame transfer process, the cut-through system is selected. Thus, if the transmission port 132 is vacant, the cut-through system is, in principle, selected. Therefore, a delay time can be reduced.

The transfer prohibition control unit 145 of the transfer management unit 143 operates based on the transfer system selected by the mode switching control unit 144 and information from the cycle timer 142 and prohibits the transfer of a non-reserved frame when the cut-through system is selected as the transfer system (that is, the transmission port is not in a transfer process) and when the time band is a reserved time band.

More specifically, when a port is not in a frame transfer process, the cut-through system is selected by the mode switching control unit 144. When the received frame is not a frame for which the band has been reserved (referred to hereinbelow as "band-reserved frame") and when the time is a reserved band time, the transfer prohibition control unit 145 prohibits the cut-through system and switches to the store-and-forward system. Within the reserved band time, a store state with frame accumulation is assumed. When the time is not a reserved band time, the transfer of accumulated frames is started and a forward state is assumed. With such transfer prohibition control, a reserved band can be ensured for the band-reserved frame and the transfer delay thereof can be prevented.

Table 1 is an operation table of the mode switching and transfer prohibition control explained hereinabove.

TABLE 1

|  | Port is not in transfer process | |
|---|---|---|
| Port is in transfer process | Reserved band time | Non-reserved band time |
| Reserved frame | Store-and-forward system | Cut-through system | Cut-through system |
| Non-reserved frame |  | Transfer prohibition, store-and-forward system | Cut-through system |

The reservation priority control unit 146 of the transfer management unit 143 preferentially transmits a band-reserved frame at a point in time a transition to a forward state is made when the band-reserved frames have been accumulated in the store state. As shown in Table 1, even with the band-reserved frame, the store-and-forward system is selected if the transmission port 132 for transfer is in the transfer process.

Figure 3:
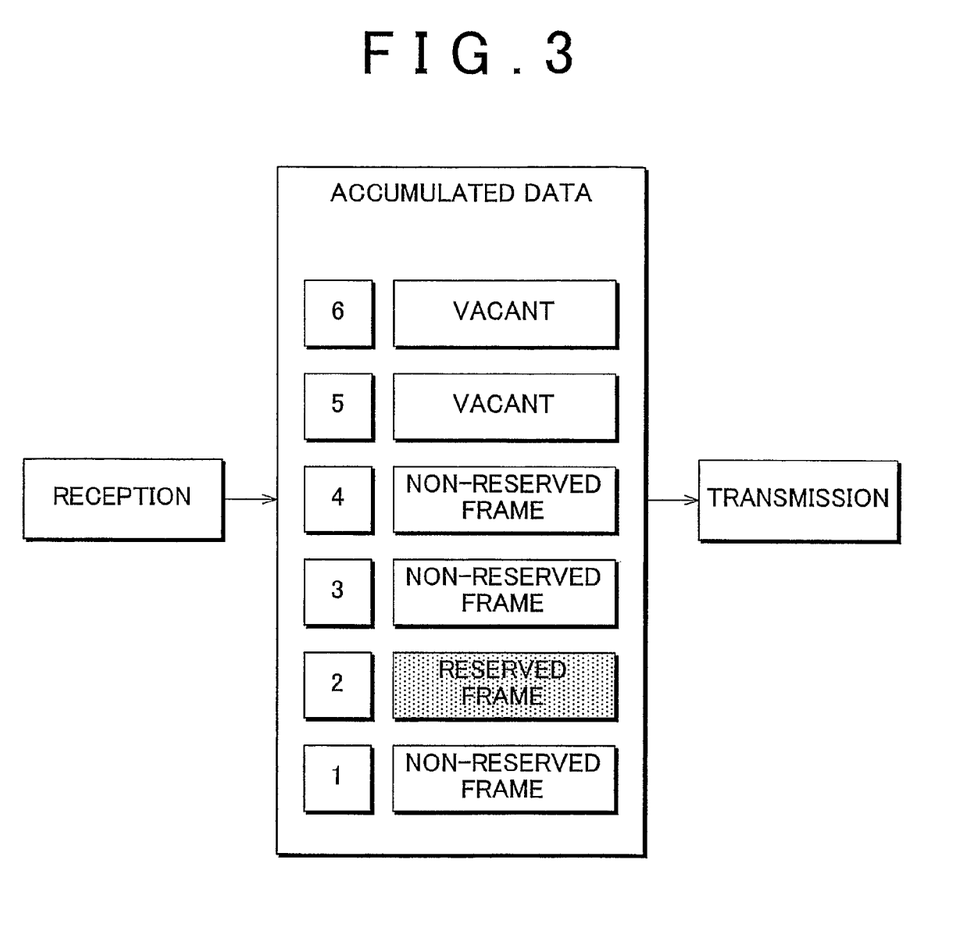
FIG. 3 is a schematic diagram of reservation priority control performed by the network device of the embodiment.

FIG. 3 is a schematic diagram of reservation priority control. In FIG. 3, four frames are accumulated as accumulated data by the store-and-forward system. The second accumulated frame is a band-reserved frame. Even when a frame that has not been band reserved (non-reserved frame in FIG. 3) was earlier accumulated, the reservation priority control unit 146 preferentially transfers a band-reserved frame (reserved frame in FIG. 3). As a result, the delay of band-reserved frame can be minimized.

Figure 4:
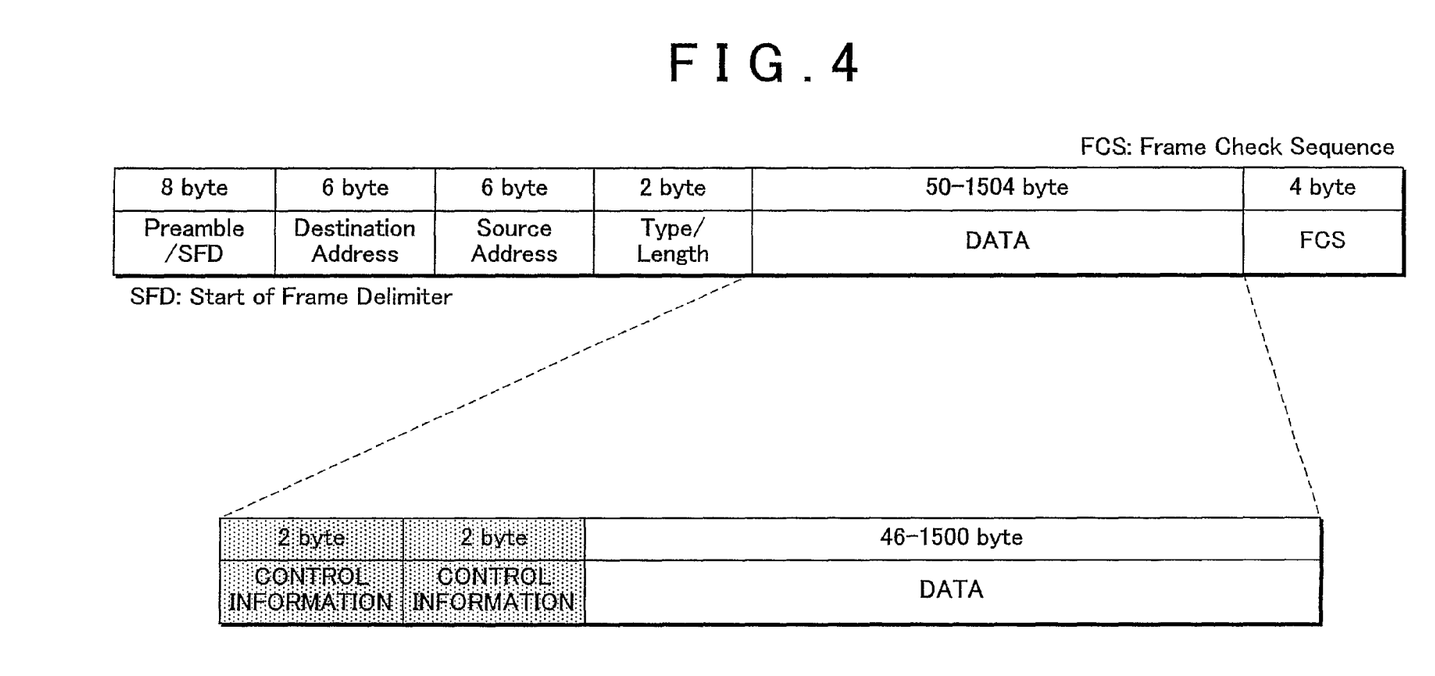
FIG. 4 is a schematic diagram of a frame transferred by the network device of the embodiment.

FIG. 4 shows an example of a transfer frame for performing the reservation priority control. In the MAC frame of IEEE 802.3, a 7-byte Preamble, a 1-byte Start of Frame Delimiter (SFD), a 6-byte Destination Address, a 6-byte Transmission Source Address, and a 2-byte Type are arranged in the header of each cycle. These are followed by DATA, and finally an Frame Check Sequence (FCS) is arranged. In the embodiment, 4-byte control data are arranged at the very end of the header, that is, at the leading end of DATA. Control information is information indicating whether the frame is a reserved frame. The reservation priority control unit 146 determines whether the frame is a reserved frame on the basis of this control information and preferentially extracts the reserved frame from the accumulated data.

As described hereinabove, in accordance with the invention, in a network device in which the cut-through system and the store-and-forward system can be switched, the cut-through system is, in principle, selected if the transmission port 132 connected to the frame transmission destination is vacant. As a result, a delay time can be reduced. Furthermore, the transfer prohibition control can ensure a reserved band for a band-reserved frame and prevent a transfer delay thereof. In addition, the delay of the brand-reserved frame can be minimized by a reservation priority control by which the accumulated band-reserved frames are transferred with the highest priority.

The invention claimed is:

1. A network device that transfers frames, comprising:
    a transmission port that conducts a transfer process by repeating a constant cycle, the constant cycle including a reserved transfer time interval in which a plurality of reserved frames are transferred at corresponding reserved time slots, and a free transfer time interval in which non-reserved frames are transferred without time slot reservation;
    a cycle timer;
    a mode switching control unit that monitors a transfer state of the transmission port and selects a store-and-forward system as a transfer method when the transmission port is in the transfer process and selects a cut-through system as a transfer method when the transmission port is not in the transfer process; and
    a transfer prohibition control unit that, when the transmission port is not in the transfer process, selects the cut-through system as a transfer system when a non-reserved frame is transmitted, and switches a transfer method of the non-reserved frame to the store-and-forward system with reference to the cycle timer when the reserved transfer time interval is established.

2. The network device according to claim 1, further comprising a reservation table having information on a time band in which a reserved frame has been reserved, wherein
    the transfer prohibition control unit determines whether the reserved transfer time interval is established, with reference to the cycle timer and the reservation table.

3. The network device according to claim 2, wherein the transfer prohibition control unit refers to the cycle timer and the reservation table, and starts the transfer of non-reserved frames accumulated in the store-and-forward system when the free transfer time interval is established.

4. The network device according to claim 1, further comprising a reservation priority control unit that preferentially transfers a reserved frame when the reserved frame is contained in the frames accumulated in the store-and-forward system.

5. The network device according to claim 4, wherein the reservation priority control unit determines whether a frame is a reserved frame on the basis of control information of the frame.

6. A frame transfer method by which a frame is transferred between network devices, comprising:
    monitoring a transfer state of a transmission port of the network device that transfers frames by repeating a constant cycle including a reserved transfer time interval in which a plurality of reserved frames are transferred at corresponding reserved time slots, and a free transfer time interval in which non-reserved frames are transferred without time slot reservation;
    selecting a store-and-forward system as a transfer method when the port is in a transfer process;
    selecting a cut-through system as a transfer method when the port is not in a transfer process; and
    when the port is not in a transfer process, selecting the cut-through system as a transfer system when a non-reserved frame is transmitted, but switching a transfer method of the non-reserved frame to the store-and-forward system when the reserved transfer time interval is established.

7. The frame transfer method according to claim 6, further comprising:
    accumulating the frames in a reserved time when transfer of the non-reserved frames in the cut-and-through system is prohibited and transferring the frames as soon as the reserved time elapses.

8. The frame transfer method according to claim 6, further comprising:
    preferentially transferring a reserved frame when the reserved frame is contained in the frames accumulated in the store-and-forward system.

9. The frame transfer method according to claim 8, wherein whether a frame is a reserved frame is determined based on control information of the frame.

10. The network device according to claim 1, wherein the constant cycle is divided equally between the reserved transfer time interval and the free transfer time interval.

11. The network device according to claim 1, wherein data in a frame transferred by the store-and-forward system is error-checked prior to transfer.

12. The network device according to claim 1, further comprising:

at least one additional transmission port that conducts a transfer process by repeating the constant cycle, wherein the network device stores a routing table identifying other network devices connected to each of the transmission port and the at least one additional transmission port, and transfer of reserved frames and non-reserved frames being performed in accordance with the routing table.

* * * * *